Aug. 21, 1956  D. E. ABELL  2,760,129
WINDING REEL SPEED LIMIT
Filed May 14, 1954
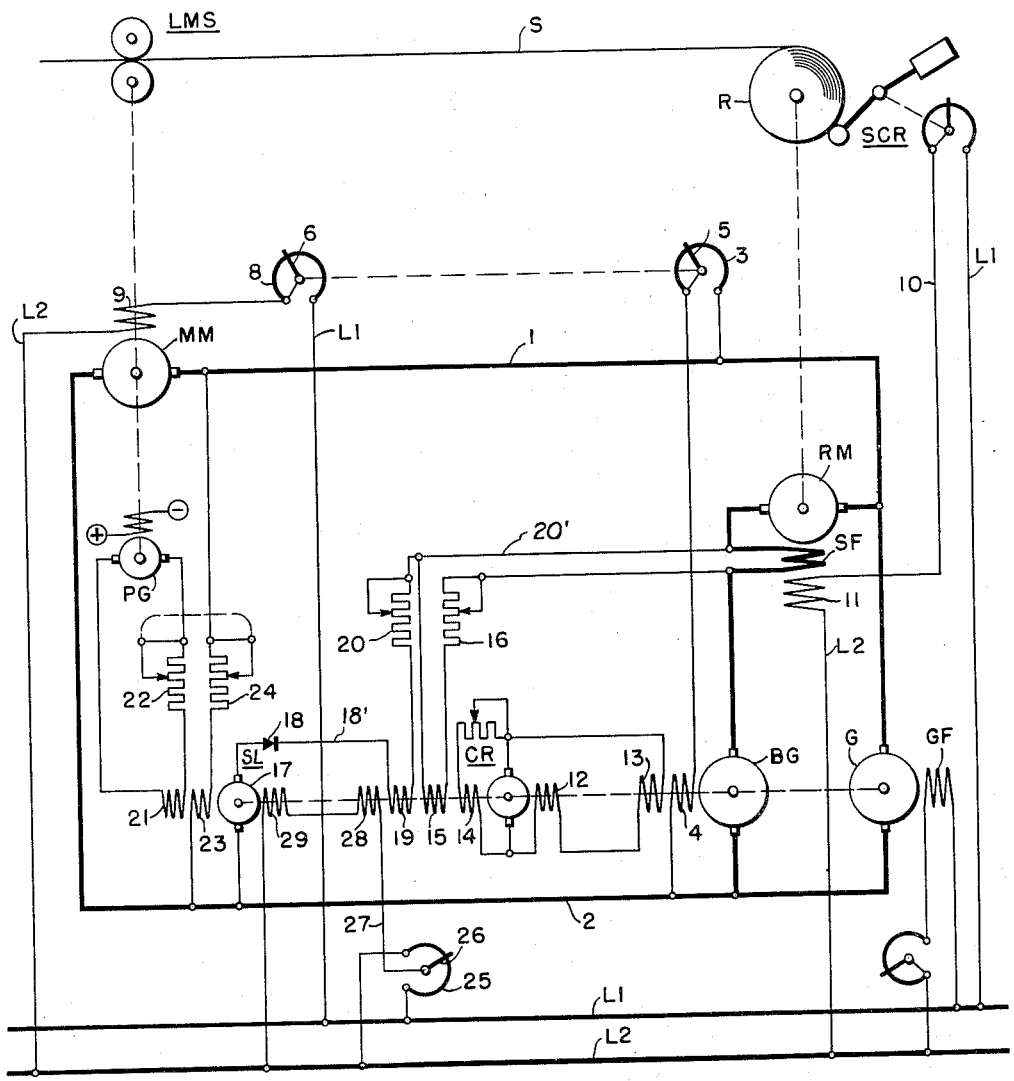
WITNESSES
INVENTOR
Donald E. Abell
BY
ATTORNEY United States Patent Office 2,760,129
Patented Aug. 21, 1956

2,760,129

WINDING REEL SPEED LIMIT

Donald E. Abell, Buffalo, N. Y., assignor to Westinghouse Electric Corporation, East Pittsburgh, Pa., a corporation of Pennsylvania Application May 14, 1954, Serial No. 429,847

11 Claims. (Cl. 318—7)

My invention relates to electric systems of control for direct current motors and more particularly to an electric system of control for limiting the speed of operation of a direct current motor subject to extremely rapid load variations.

In certain mill operations, the material being processed passes from the last mill stand to the winding reel. There is thus a mechanical tie between the last mill stand and the reel. The speed of the winding reel motor is thus determined by the speed of the last mill stand, the size of the reel, and also to some extent on the tension in the strip of material being wound on the reel. When the strip breaks, the motor, while operating a heavy load, is suddenly unloaded. The result will be, in the absence of any speed limiting control, that the motor will tend to speed up to excessive speeds—runaway speeds. A somewhat similar unloaded operation of the motor occurs when threading the strip with a belt-wrapper.

One broad object of my invention is provision for limiting the speed of a direct current motor when the motor is unloaded.

Another broad object of my invention is the provision of rapidly controlling the voltage supplied to a direct current motor with a rapid change of load on the motor to prevent excessive motor speeds.

Other broad and more specific objects of my invention will become more apparent from a study of the following specification and the accompanying drawing, in which the single figure is a diagrammatic showing of my system of control as applied to a mill drive including a winding reel motor.

In the figure the main generator G and the bucking generator BG are shown coupled to the same drive shaft and the two machines are coupled to a suitable constant speed induction motor or other type of motor (not shown). The main generator has its field winding GF coupled to the constant voltage direct current buses L1 and L2 through suitable rheostatic means. The generator voltage is thus substantially constant.

The reel motor RM for operating the reel R and the mill motor MM for operating the last mill stand LMS are both connected to the main generator buses 1 and 2. The electrical connection of the mill motor MM to the main generator is a direct connection whereas the electrical connection of the reel motor armature to the main generator is less direct since it also includes the series field winding SF of the reel motor and the armature of the bucking generator BG.

The voltage output of the bucking generator BG, since it runs at constant speed, is determined by the effective excitation produced by the values of the field currents in the field windings 4 and 13.

The field circuit for the field winding 4 of the bucking generator includes the rheostat 3 and is connected across the output buses 1 and 2 of the generator G. The operation of the rheostat 3 is ganged to the operation of the rheostat 8 in the field circuit of field winding 9 for the mill motor MM.

It will be noted that operation of the rheostat arms 5 and 6, respectively, say in a clockwise direction will increase the field current in field winding 9 and will increase the field current in field winding 4. This means that the normally bucking generator BG, considering field winding 4 only, will provide a bucking voltage proportional to the bus voltage of buses 1 and 2 of the generator G and proportional to the setting of the mill motor field rheostat. Since the mill speed, namely the speed of the mill motor MM, is a function of the voltage supplied to the motor MM and to the excitation, or field strength, of field winding 9, it is apparent that the voltage across the reel motor armature winding will be proportional to strip speed.

The reel motor RM has the series field winding SF and the separately excited field winding 11. The circuit for field winding 11 may be traced from bus L1 through sections of the speed control rheostat SCR, conductor 10, field winding 11 to bus L2. The speed control of the reel motor as a function of the size of the reel is in itself not my invention but is illustrated schematically to show the complete combination.

The function of the bucking generator is also to provide constant reel motor armature current and thus to provide constant tension in the strip S. The constant reel motor armature current is effected through the current regulating generator CR.

The output of the current regulating generator CR is supplied to its self-energizing field winding 12 and the field winding 13 of the bucking generator BG. The regulating generator has an anti-hunt field winding 14, a current field winding 15 connected across the series field winding SF through a suitable rheostat, or adjustable resistor 16, a speed limit field winding 19, and a pattern field winding 28.

The speed limit field winding 19 is connected in a loop circuit that includes the armature 17 of the speed limit generator SL, the rectifier 18, the speed limit field winding 19, adjustable resistor 20, the series field winding SF of the reel motor RM, the armature of the bucking generator and bus 2 back to the armature 17 of the speed limit generator SL.

From the circuit traced in the preceding paragraph, it is apparent that speed limit is obtained by measuring the voltage of generator BG and comparing it with a reference voltage, namely the voltage of the speed limit generator SL. The reference voltage represents what the bucking voltage should be under normal conditions.

The speed limit generator SL has one field winding, namely its pattern field winding 21, connected in series with the armature of the pilot generator PG and a suitable adjusting resistor 22. The excitation of the speed limit generator SL increases linearly from zero to some maximum value as the mill speed increases. The speed limit generator also has a voltage field winding 23 connected, through a suitable resistor 24, to buses 1 and 2, and is so wound as to be differential to the effect of field winding 21. In operation the voltage on the buses 1 and 2 is raised before the excitation of the mill motor field winding 9 is weakened, and the arrangement is such that the excitation of the voltage field winding 23 reaches its maximum when the excitation of the pattern field winding 21 is at half speed value, assuming a 2 to 1 speed range mill motor. If a mill motor speed range other than 2 to 1 is selected, some change in characteristics will result. If such change in characteristics is desired, no modifications in the circuit parameters need be made.

If it is desired to control the field windings 21 and 23 jointly, as may be desirable in some applications, then the rheostats 22 and 24 may be ganged as shown by the broken line connection.

The potentiometer 25 connected directly across the leads L1 and L2 provides a tension rheostat. The tension rheostat, namely the arm 26, is manually set by the operator. As thus set the tension rheostat represents a reference to be regulated for. The adjustment of arm 26 thus provides a pattern excitation for both the regulating generator CR and the speed limit generator SL. This is so because the pattern field windings 28 and 29 of these two machines are connected in the circuit from arm 26. The circuit may be traced from arm 26 through lead 27, pattern field winding 28 of the current regulating generator CR, pattern field winding 29 of the speed limit generator SL to the lead L2.

Normally, the voltage of the speed limit machine matches the voltage of the bucking generator BG and this is so even when the tension setting is changed because field windings 28 and 29 will be affected in like manner.

The regulating feedback into the current regulating generator is provided by the reel motor armature current which energizes the field winding 15 as a function of armature current.

To better understand my invention, I shall refer to specific voltage values and polarities of the generators and the relative manner of the excitations of certain of the field windings. Such designations or specific values of electrical characteristics are, however, merely illustrative.

Let the voltage output of generator G be 300 volts and let lead 1 be considered at positive 300 volts and lead 2, the negative lead, be at zero volts.

Field winding 4 of generator BG supplies the main excitation for this generator. Let this main excitation be 60% and the excitation of field winding 13 be 40% in the same sense and when operation is normal. With fields 13 and 4 thus excited, let the voltage output of generator BG be such that lead 29' is at 80 volts positive.

Field windings 21 and 23 act differentially and the excitation and sense of field winding 29 is so selected that the output voltage of the speed limit generator SL measured across leads 2 and 18', is 80 volts. In other words, for normal operation, there is zero excitation in the speed limit field winding 19. The poling of the rectifier 18 and the winding direction of field winding 19 is such that it acts in opposition to field winding 28, the pattern field winding of the current limit generator CR. The current limit field winding 15 acts cumulatively with field winding 19.

When the strip S breaks, or during threading operation, the load current begins to drop. The excitation of field winding 15 thus decreases and in consequence the bucking voltage of generator BG decreases. Lead 20' now becomes less positive than lead 18' and current begins to flow in field winding 19 to aid the field winding 15. While it may be possible that the voltage of generator BG may momentarily reverse when the strip breaks, but the excitation of field winding 19 builds up rapidly and thus prevents complete loss of the bucking voltage of the generator BG. In actual practice, the bucking voltage may drop as much as 30 volts, or possibly more, but this still leaves 50 volts of bucking voltage. The total voltage on the reel motor RM thus increased from 220 volts to 250 volts, but not to 300 volts. The speed is thus limited during strip breakage.

IR compensation is provided by furnishing an excitation to the speed limit machine proportional to the current regulator excitation.

My system of control in addition to being simpler and less expensive than prior somewhat similar systems of control is also more reliable and expeditious in action since it inherently contains one less time delay in the regulating loop and thus greatly increases the stability of the speed limit system.

While I have disclosed but a single embodiment of my invention, it is to be understood that the invention is capable of various adaptations and that changes and modifications may be made and substitutions resorted to which fall within the spirit of my invention.

I claim as my invention:

1. In an electric control system, in combination, a motor connected in driving relation with a reel device associated with mill apparatus, generating means including a main generator and a bucking generator connected in a loop circuit with said motor to supply electrical energy to the motor, regulating means, circuit means connecting the regulating means to normally control the output voltage of the bucking generator to maintain the armature current of the motor at a predetermined value, additional regulating means, circuit means connecting said additional regulating means to control the aforesaid bucking generator to affect the operation of the main generator to maintain a predetermined speed relation of the motor and the mill apparatus, only when the motor speed causes said predetermined speed relation to be exceeded.

2. In an electric control system, in combination, a reel motor connected in driving relation with a reel handling a strip of material from mill apparatus, generating means including a substantially constant voltage main generator and a bucking generator connected in series in a loop circuit with said reel motor to supply electrical energy to the motor, first regulating means, circuit means connecting said first regulating means to normally regulate the output voltage of the bucking generator to maintain a predetermined value of reel motor armature current, second regulating means inductively coupled with the said first regulating means, and means including a blocking rectifier and means for producing a bias voltage component in said second regulating means to effectively affect the operation of the first regulating means only when the speed relation of the reel motor and the mill apparatus reaches a predetermined value.

3. In an electric control system, in combination, a motor connected in driving relation with a reel device for handling a strip of material from a rolling mill, generating means including a substantially constant voltage main generator and a bucking generator connected in series with each other and in a loop circuit with said motor to supply electrical energy to the motor, a regulating generator having a plurality of field windings, circuit means connecting one of said windings for energization in accordance with the armature current of the reel motor, circuit means including a rectifier device connecting another of said windings to said bucking generator in a current blocking sense, and an additional regulating generator responsive to a predetermined speed condition of the reel motor connected in opposed relation with the source of control voltage.

4. In an electric control system, in combination, a motor connected in driving relation with a reel device disposed to wind a strip of material proceeding from a work device, first regulating means, circuit means connecting said first regulating means to provide field excitation for the motor to maintain a predetermined value of motor E. M. F., generating means operable to supply electrical energy to the motor, said generating means including a substantially constant voltage main generator and a bucking generator, second regulating means, circuit means connecting the second regulating means acting on said bucking generator to normally regulate the supply of electrical energy in accordance with the value of the armature current, speed regulating means and circuit means including unidirectional current means and blocking voltage means connecting the speed regulating means to effect operation of the second regulating means in accordance with the speed relation of the reel motor and the work device when said relation exceeds a predetermined value.

5. In an electric control system, in combination, a reel motor connected in driving relation with a delivery reel for winding a strip delivered by a mill stand comprising, a substantially constant voltage generator connected to supply electrical energy to the reel motor, a bucking generator, a regulating generator having a plurality of field windings connected to provide field excitation for the bucking generator, circuit means connecting one of said field windings for energization in accordance with the armature current of the reel motor, and additional circuit means including a rectifier device and a control generator connecting another one of said field windings to a source for energization only when the reel motor exceeds a predetermined speed relation with the mill stand.

6. In combination with a reel motor having a field winding and an armature mechanically coupled in driving relation with a delivery reel for winding a strip proceeding from a mill stand, first regulating means, circuit means connecting the regulating means to vary the energization of the field winding to maintain a substantially constant motor E. M. F., generating means including a substantially constant voltage main generator and a bucking generator connected in series with each other and in a loop circuit with said motor to supply electrical energy to the motor armature, second regulating means, circuit means connecting the second regulating means to vary the output voltage of the bucking generator to maintain a predetermined value of motor armature current, means including a control generator selectively responsive to the speeds of the mill stand and the reel motor, and circuit means including rectifier means connecting the control generator to control the operation of the second regulating means to limit the output voltage of the first regulating means only when the reel motor exceeds a predetermined speed relation with the mill stand.

7. The combination in a control system for a reel device, of a motor having a field winding and an armature mechanically coupled in driving relation with the reel device, regulating means connected to supply electrical energy to the motor field winding, generating means including a substantially constant voltage main generator and a bucking generator connected in series with each other and connected in a loop circuit with the motor armature winding to supply electrical energy to the motor armature winding, a regulating generator having a plurality of field excitation windings connected to control the output voltage of the bucking generator, a tension selecting rheostat, circuit means connecting a first one of said field windings through said rheostat to a source of constant voltage, additional circuit means connecting a second one of said field windings for energization in accordance with the armature current of the motor, circuit means connecting a third one of said field windings to said bucking generator, rectifier means connected in blocking relation with said third one of said field windings and said bucking generator, and a control generator connected in circuit relation with said third one of said field windings in opposed relation with the voltage of said bucking generator, said control generator being responsive to the speed of the mill.

8. In an electric control system, in combination, a reel device disposed to cooperate with mill apparatus having speed control means, a motor mechanically coupled in driving relation with the reel device, generating means including a substantially constant voltage main generator and a bucking generator connected in a loop circuit with the motor to supply electrical energy to the motor, a regulating generator circuit means connecting the regulating generator to control the output voltage of the bucking generator, said regulating generator having a plurality of field windings, an additional regulating generator, circuit means connecting said additional regulating generator to effect energization of one of said windings only when the reel motor exceeds a predetermined speed relation with the mill apparatus speed control means, circuit means connecting the speed control means to effect variation of the output of the additional regulating generator relative to the speed of the reel motor in accordance with predetermined operating position of the speed control means of the mill apparatus.

9. The combination in an electric control system for a reel device associated with mill apparatus having a speed controlling rheostat therefor, of a reel motor coupled in driving relation with the reel device, generating means connected including a substantially constant voltage main generator and a bucking generator connected in a loop circuit with the reel motor to supply electrical energy to the reel motor, a regulating generator connected to supply field excitation to the bucking generator, said regulating generator having a plurality of field windings, circuit means connecting a first one of said field windings for energization in accordance with the motor armature current, a source of control voltage, additional circuit means connecting a second one of said field windings to said source of control voltage in opposed relation to said one winding, circuit means including a control generator connected to energize a third one of said field windings, said generator having excitation means, circuit means connecting the excitation means for energization in accordance with the speed of the mill, and control means operable in accordance with operation of the speed control means to vary the energization of the excitation means of the control generator.

10. In combination in an electric control system for a reel device associated with a mill stand, in combination, a motor having an armature mechanically coupled in driving relation with the reel device and having an armature winding and a field winding, circuit means connecting the motor field winding to a source of controlled electrical energy, generating means connected to supply electrical energy to the motor armature, said generating means including a main generator and a bucking generator, a regulating generator disposed to supply field excitation to the bucking generator, said regulating generator having a plurality of field windings including one field winding energized from a source of adjustable control voltage and a second opposed field winding energized in accordance with the armature voltage of the bucking generator, circuit means including a rectifier device connecting said second of said plurality of field windings to said bucking generator in blocking relation, a control generator connected in circuit relation with said second winding in opposed relation with the voltage of the bucking generator, said control generator having a plurality of field windings including one field winding disposed to be energized in accordance with the speed of the mill stand and another field winding in an opposed sense in accordance with the motor armature voltage, and control means operable to vary the energization of said field windings jointly.

11. In an electric control system, in combination, a motor connected in driving relation with a reel device for handling a strip of material from a work device, generating means including a main generator and a bucking generator connected to supply electrical energy to the motor, a regulating generator normally disposed to regulate the output voltage of the bucking generator in accordance with the armature current of the reel motor, an additional regulating generator having a plurality of field windings, a rectifier device connecting the additional regulating generator to modify the output voltage of said first regulating generator, circuit means connecting one of the field windings of the additional regulating generator to a source of control voltage to produce an output voltage opposed in sense to the rectifier device, and additional circuit means connecting at least another of said field windings to produce an output voltage in accordance with a differential between the speed of the work device and the voltage of the bucking generator.

References Cited in the file of this patent
UNITED STATES PATENTS
2,476,796   Bacheler _____ July 19, 1949